Sept. 29, 1942.   W. R. GERRY   2,296,993
CONTROL DISCONNECT
Filed May 31, 1941
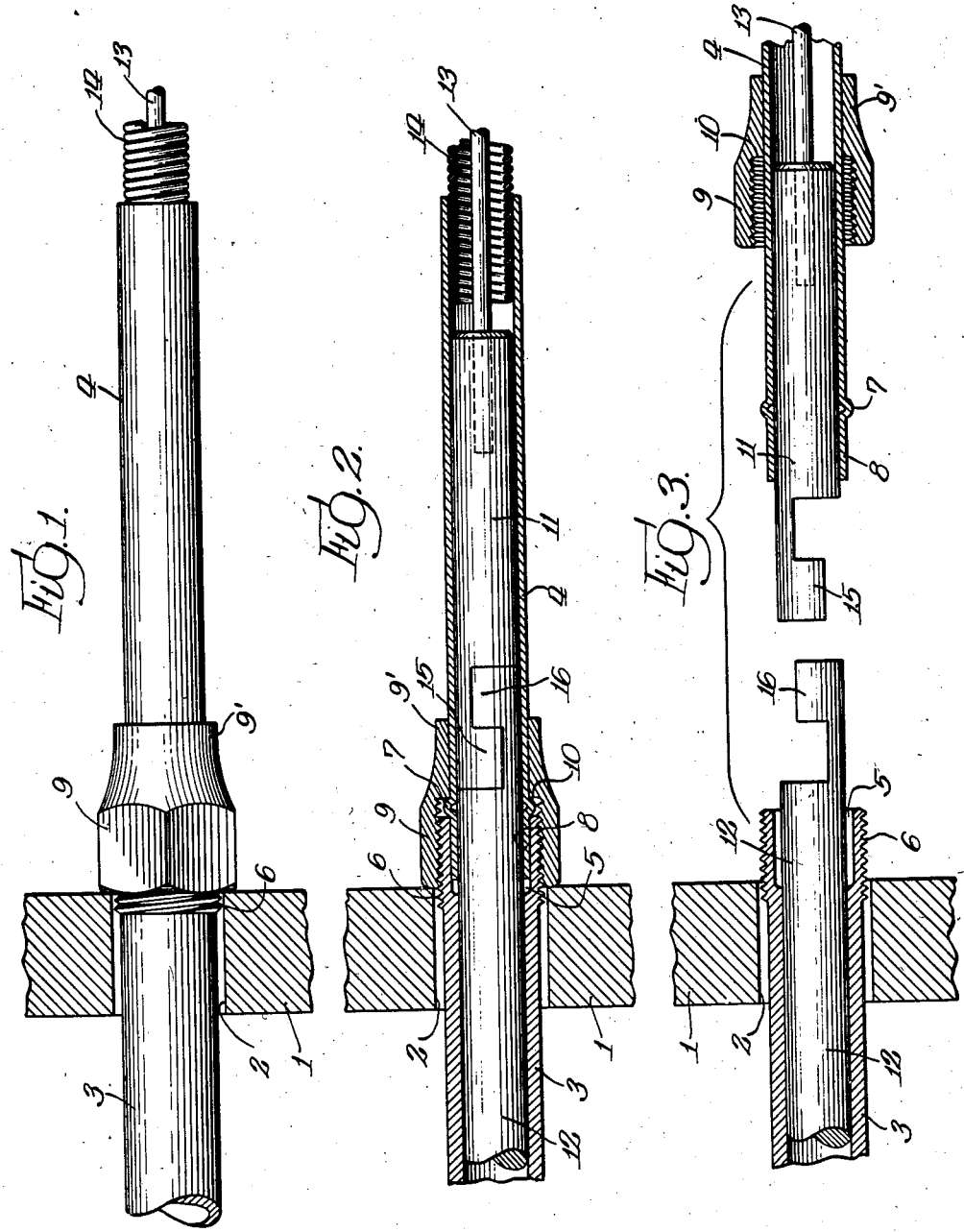
INVENTOR.
William R. Gerry,
BY W. F. Kellogg Atty.

Patented Sept. 29, 1942

2,296,993

UNITED STATES PATENT OFFICE 2,296,993

CONTROL DISCONNECT

William R. Gerry, Kalamazoo, Mich., assignor to Shakespeare Products Company, Kalamazoo, Mich., a corporation of Michigan Application May 31, 1941, Serial No. 396,091

1 Claim. (Cl. 74—501)

This invention relates to improvements in linear motion transmitting devices for controls and particularly, those classes or types of controls used upon motor driven vehicles such as airplanes, automobiles, motor boats and the like, having for an object to provide a mechanically simple, durable and efficient disconnect for an equipped control capable of being conveniently and rapidly disconnected or disassembled to facilitate easy and quick removal of motors for repair or replacement and, as advantageously, reconnected.

Other objects of the invention will be in part obvious and in part pointed out hereinafter.

In order that the character of my invention and those advantages incident to usage of the same may be better understood and appreciated by workers skilled in the art, it may be explained that in the modern servicing of airplanes, as well as other vehicles, it is highly desirable that the motors thereof and their controls be completely removable and disconnectible to facilitate repairs or replacement in the shortest possible periods of time; moreover, that the repaired motors or replaced motors and their controls shall be likewise installed. Towards effecting satisfactory accomplishment of the foregoing, it is all-important that the motor attachments, i. e., the controls, shall be easily and quickly disconnectible and removable along with the motor and thereafter, as easily and quickly reconnectible.

Heretofore, it has been the practice to extend controls through the instrument panel board of an airplane or automobile into engagement with the devices or apparatus to be operated or controlled thereby. The linear motion transmitting means of the control has been constructed in one piece and that portion of the control passing through the panel has been fastened to the same by nut and washer or similar fastening means. Such mode of fastening, obviously, necessitates material and prohibitive expenditures of labor and time in controls disconnection to ready the equipped motor for removal and repairs, and reinstalling and reconnecting the motor (repaired or replacement) and its controls. To avoid these uneconomical and time absorbing operations, it is most desirable to provide means whereby all controls can be disconnected on the engine side of the vehicle fire wall. My improved disconnect renders such operation possible and practicable and at the same time, affords a rigid, strong and durable connection, equally as efficient as the original control.

In order that the invention and its mode of operation may be readily understood by those skilled in the art to which it appertains, I have in the accompanying drawing and the detailed description based thereupon, set out one embodiment of my invention.

In the drawing:

Figure 1 is a side elevation of my improved disconnect, a portion of the body tube being broken away and the opposite portion thereof showing connection with a flexible housing and cable; also showing a fragment, in section, of an equipped vehicle fire wall.

Figure 2 is a longitudinal section through the improved disconnect, with the sectional rods shown in elevation; and Figure 3 is a similar view of the disconnect in disassembled or disconnected form.

Having more particular reference to the drawing, in connection with which like characters of reference will designate corresponding parts throughout, I have, as above stated, shown my improved disconnect associated with the fire wall 1 of a vehicle (an airplane, automobile, etc.) said fire wall having an opening 2 in an appropriate portion of the same through which the body tube of the disconnect passes. It will be understood, however, that the illustrated and hereinafter described adaptation of the disconnect need not necessarily maintain. Other adaptations or installations may be effected, such as conditions or preference may dictate.

The disconnect consists of a body tube, including elongated tubular sections 3 and 4. The normally inner end portion of the body tube section 3 is formed with an internal annular chamber 5 while the outer periphery of this particular portion is screw-threaded, as indicated at 6. The remaining body tube section 4 is provided with a circumferentially disposed abutment or lip 7, preferably formed by outwardly depressing an appropriate portion of said tube near, though inwardly spaced from, its normally inner end, as shown in Figures 2 and 3. Thus, an approximately nipple-like extension is provided the body tube section 4 beyond the annular abutment 7. This sleeve or approximately nipple-like extension, designated for convenience by the numeral 8, is adapted to be snugly received within the chamber 5 of the body tube section 3 (see Figure 2), its extent of inward engagement into said chamber 5, obviously, being limited by engagement of the adjacent side of the annular abutment 7 with the adjacent end or marginal portion of such section 3.

At this point, attention is invited to the fact that the outside diameter of the body tube section 3 is slighly greater than that of the body tube section 4, though the inside diameter of each said sections 3 and 4 correspond. In example, the body tube section 3 may have an outside diameter of ⅜ of an inch while the body tube section 4 may be of 7⁄16 inch outside diameter, but the inside diameters of these sections correspond.

In order that the body tube sections 3 and 4 may be interconnected and securely held in that assembled relation shown in Figures 1 and 2, I provide a connecting nut 9, preferably provided with an elongated shank 9', snugly and slidably or movably engaged over that portion of the body tube section 4 outwardly of the annular abutment 7 and the sleeve or approximately nipple-like extension 8. The connecting nut 9, as will be understood upon reference to Figures 2 and 3 of the accompanying drawing, is adapted to be turned into engagement with the screw-threads 6 on the adjacent end of the body tube section 3. In this manner, it will be understood that the adjacent end of the section 3 and the adjacent side of the annular abutment 7 on the section 4 will be drawn into firm engagement, because of the fact that the elongated shank 9' is formed with an internal annular shoulder 10 upon its inner end portion; particularly, at its point of jointure with the nut 9. Hence, as the connecting nut 9 is turned over the screw-threaded portion 6 of the section 3, the annular internal shoulder 10 of the shank 9' will engage with the normally outer side of the annular abutment 7, as shown in Figure 2, and as heretofore described, the adjacent end of the section 3 will be drawn into firm and positive engagement with its particularly adjacent side of said annular abutment 7.

It is desirable, of course, that the connection between the body tube sections 3 and 4 shall be possessed of a maximum of rigidity and strength. To attain this, the connecting nut 9 is formed with its long or elongated shank 9'. By the same token, the body tube sections 3 and 4 are of such lengths or elongations as to afford comparative long bearing surfaces for the relatively coaxially disposed rods which are slidably received therein, and which will be presently more fully described.

Slidably received within the body tube constituted by the sections 3 and 4 is a pair of relatively coaxially disposed rods 11 and 12. The rod 11 has one end of a flexible wire or cable 13 fixed thereto and extended through the usual flexible housing 14 connected to an adjacent end portion of the body tube section 4 on the engine or motor side of the fire wall 1. This cable 13, as will be understood, is extended into operative connection with the particular device or apparatus for control by the linear motion transmitting means. The rod 12 may be equipped with elements similar to the referred to cable 13 and flexible housing 14 or if desired, may have direct connection with a suitable handle or knob (not shown). This described arrangement, of course, may be reversed if desired.

The coaxially disposed rods 11 and 12 are connected at their adjacent or meeting ends by means of a scarf joint formed by providing complemental though reversely arranged elements or fingers 15 and 16 upon such meeting ends and bringing them into overlapping and interengaged relationship as shown in Figure 2 of the accompanying drawing. With interconnection of the elements 15 and 16 of the scarf joint, as shown, the body tube section 4 is moved so that the extension 8 thereof is introduced into the chamber 5 of the body tube section 3 with the adjacent side of the annular abutment 7 of the section 4 in abutting contact with the adjacent end thereof. At this time, the connecting nut 9 is slid along the body tube section 4 and turned into locking or connecting engagement with the screw-threaded portion 6 of the body tube section 3, thereby firmly joining sections 3 and 4 of the body tube in substantially rigid relationship. With the connecting nut 9 and its elongated shank 9' in operative or connecting position, it will be understood that the interlocking elements 15 and 16 of the aforesaid scarf joint will be positively retained interconnected and hence, that the coaxially disposed rods 11 and 12 will be joined insolong as they are arranged or confined within the sectional body tube comprised by the sections 3 and 4. However, with disengagement of the connecting nut 9 from the screw-threaded portion 6 of the section 3, the section 4 may be moved so that its extension 8 is removed from the chamber 5 of the section 3. Either or both body tube sections 3 and 4 may be moved so as to expose the interlocking elements 15 and 16 of the rods 11 and 12, allowing them or either of them to be laterally disengaged or disconnected. When the rods 11 and 12 have been thus disconnected, it is obvious that that portion of the control on the engine or motor side of the fire wall 1 may be freely removed together with the equipped engine or motor. To reconnect the above described separable elements of the control, it is only necessary that interengaging or interlocking connection be effected between the elements 15 and 16 of the scarf joint, whereupon the sections 3 and 4 of the body tube are relatively engaged thereabout and then rigidly connected by turning the connecting nut 9 onto the screw-threaded portion 6 of the body tube section 3. Insolong as the coaxially disposed rods 11 and 12 are retained or confined within the sectional body tube, it will be seen, as heretofore stated, that said rods will remain connected, thus allowing for the transmission of linear motion thereby to or from an equipped motor device or apparatus.

The comparatively long bearing surfaces provided the rods 11 and 12 by the interconnected body tube sections 4 and 3, respectively, will provide for and maintain a rigid and strong connection, with a maximum of bracing or rigidity at their point of connection or jointure through the connecting nut 9 with its elongated shank 9', as hereinbefore described.

I claim:

A disconnect for controls, comprising co-axially juxtaposed tubular bodies having different outside diameters and substantially corresponding inside diameters, the outer sides of each said bodies being substantially even and smooth throughout their respective lengths, the inner end portion of one of said bodies having an outwardly opening internal chamber therein extending for a portion of its length receiving the inner end portion of the remaining body, an outer peripherally disposed stop on said remaining body spaced from its inner end and abuttingly engageable with the adjacent end of the first mentioned body, coupling means, a reduced elongated shank on one end of said coupling means, snugly and slidably engaging over said remaining body outwardly of said stop and engageable therewith, the coupling means engaging with and over a portion of the outer periphery of the first mentioned body overlying its internal chamber, and co-axially disposed interengageable rods slidably received within said tubular bodies.

WILLIAM R. GERRY.